United States Patent [19]

Anderson et al.

[11] B 3,915,416

[45] Oct. 28, 1975

[54] ANNULAR MOMENTUM CONTROL DEVICE USED FOR STABILIZATION OF SPACE VEHICLES AND THE LIKE

[75] Inventors: Willard W. Anderson, Yorktown; Nelson J. Groom, Newport News, both of Va.

[73] Assignee: The United States of America as represented by the United States National Aeronautics and Space Administration Office of General Counsel-Code GP, Washington, D.C.

[22] Filed: Aug. 1, 1973

[21] Appl. No.: 384,773

[44] Published under the Trial Voluntary Protest Program on January 28, 1975 as document no. B 384,773.

[52] U.S. Cl. ............... 244/165; 74/5.7; 244/3.21
[51] Int. Cl.² ........................................ B64G 1/00
[58] Field of Search ...... 244/1 SA, 3.2, 3.21, 77 SS, 244/165; 74/5.7; 318/161; 310/12, 156; 46/50; 308/10

[56] References Cited
UNITED STATES PATENTS

| 1,551,347 | 8/1925 | Trombetta | 318/161 |
| 3,019,555 | 2/1962 | Poticha | 46/50 X |
| 3,370,377 | 2/1968 | Frangos | 46/50 |
| 3,477,298 | 11/1969 | Howe | 74/5.7 X |
| 3,480,811 | 11/1969 | Grosbard | 310/156 |
| 3,582,019 | 6/1971 | Pisacane | 244/1 SA |
| 3,621,603 | 11/1971 | DeGelder | 46/50 X |
| 3,731,984 | 5/1973 | Habermann | 308/10 |

Primary Examiner—Trygve M. Blix
Assistant Examiner—Barry L. Kelmachter
Attorney, Agent, or Firm—Howard J. Osborn; Wallace J. Nelson; John R. Manning

[57] ABSTRACT

A gyrostabilized space vehicle which is disclosed having its body mounted coaxial with the axis of rotation of an annular-shaped inertial mass and within the annulus thereof. A linear induction motor drives the inertial mass. A plurality of magnetic bearings rotatably supports the inertial mass within a housing enclosing the inertial mass. Suitable mounting members join the centrally positioned body of the vehicle with the housing.

9 Claims, 3 Drawing Figures

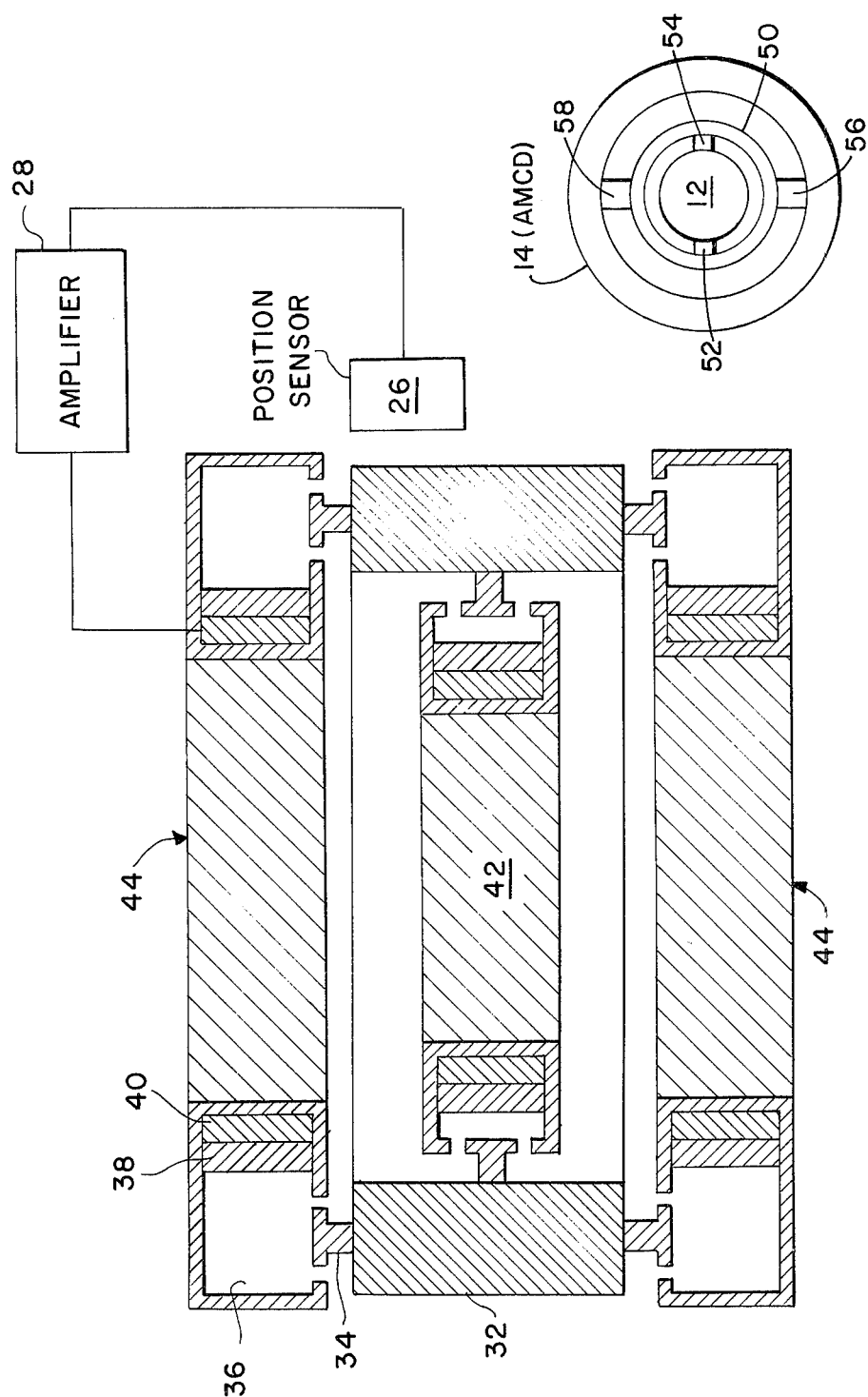

ANNULAR MOMENTUM CONTROL DEVICE USED FOR STABILIZATION OF SPACE VEHICLES AND THE LIKE

ORIGIN OF THE INVENTION:

The invention described herein was made by employees of the United States Government and may be manufactured and used by or for the Government for governmental purposes without the payment of any royalties thereon or therefor.

BACKGROUND OF THE INVENTION:

1. FIELD OF THE INVENTION

The invention relates to vehicles such as spacecraft which incorporate an annular momentum storage device for stabilization of the vehicle about two axes which are perpendicular to the axis of rotation of the annular momentum storage device. However, the invention also has utility for stabilizing any type of vehicle where it is necessary to maximize the stabilization force produced by annular momentum storage mass per unit of mass occupied by the vehicle.

2. DESCRIPTION OF THE PRIOR ART

Prior art stabilization systems for vehicles use a flywheel with a central shaft journaled by bearings. Rotational inertia is imparted to the flywheel by driving the central shaft with an electric motor or other suitable type of prime mover.

The use of a flywheel to produce the large force necessary to stabilize a vehicle such as a spacecraft has a number of disadvantages. The spatial configuration of the driven shaft and the rotating inertial mass of the flywheel requires more mass and volume per unit of angular momentum produced than the inertial mass in the instant invention. Additionally, the location of the central drive shaft and motor with respect to the inertial mass makes it impossible to locate the body of a vehicle within the annulus of the inertial mass.

Yeadon (U.S. Pat. No. 2,953,925) discloses a fluid mass gyroscope for stabilization of vehicles. The inertial mass of this gyroscope is an electrically conductive fluid which is driven through a toroidal shaped raceway by a direct current magnetic field. While Yeadon discloses a gyroscope that dispenses with a central drive shaft for rotating his inertial mass, he does not suggest that the body of a spacecraft or other vehicle may be disposed within the annulus of his rotating mass.

Sylvia (U.S. Pat. No. 3,214,982) discloses a gyroscope having a rotor which is driven by a polyphase induction motor whose stator is disposed within the hub portion of the rotor.

Grosbard (U.S. Pat. NO. 3,480,811) discloses a magnetic accelerator having a rotor disposed within a toroidal shaped housing which also contains a direct current motor for driving the rotor. However, Grosbard does not suggest that the body of the vehicle may be disposed within the annulus of the housing.

SUMMARY OF THE DISCLOSURE

The disadvantages and limitations of the prior art are solved by the instant invention which comprises a gyrostabilized vehicle having its body centrally disposed within the annulus of an annular shaped rotating inertial mass. A plurality of magnetic bearings support the inertial mass and are attached to a toroidal shaped housing which encloses the inertial mass. A linear induction motor is mounted along either the inner or outer periphery of the inertial mass for driving the same. Suitable radially projecting members are attached between the centrally located body of the vehicle and the housing containing the inertial mass.

The cost of manufacturing an annular momentum control device of a given pointing stability according to the instant invention is less than the cost of manufacturing annular momentum control devices used in prior art space vehicles.

One advantage of centrally disposing the body of the vehicle within the annulus of a toroidal shaped housing is topological. Replacement of the central drive shaft and motor of the annular shaped inertial mass by a peripherially mounted linear induction motor maximizes the angular momentum produced per unit volume and per unit mass of the inertial mass by increasing the radial dimension of the inertial mass to the maximum allowed by the spacecraft vehicle dimensions. The maximization of angular momentum is inherently produced by the topology of the annular momentum control device with respect to the vehicle body.

BRIEF DESCRIPTION OF THE DRAWINGS:

FIG. 3 is sectional view of the detailed contruction of the magnetic bearings shown in FIG. 2; FIG. 4 is an end view similar to FIG. 1 and illustrating one suitable gimbal connection for the annular momentum control device with a vehicle.

Figure 1:
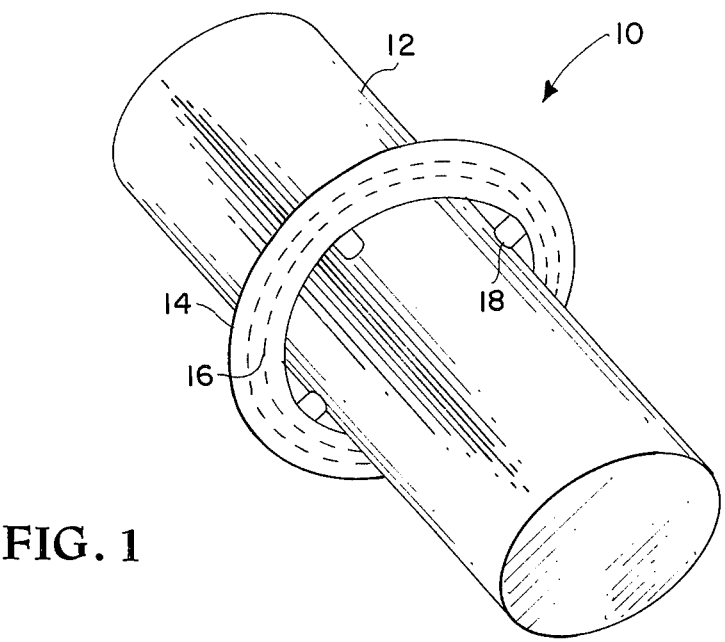
FIG. 1 is a view of a composite space vehicle utilizing the annular momentum control device of the present invention.

DETAILED DESCRIPTION OF THE INVENTION:

Referring to FIG. 1, numeral 10 designates a complete directionally stabiilized vehicle which has been constructed according to the instant invention.

The body of the vehicle 12 is shown to be cylindrical although it is to be understood that other body shapes could be used with equal facility, e.g, spherical, etc. The detailed construction of the body 12 per se forms no part of the instant invention. However, numerous configurations will be readily apparent to those skilled in the art of constructing vehicle bodies.

A toroidal shaped housing 14 contains an annular shaped rotor 16 shown in phantom. The details of the annular momentum control device (AMCD) will be further elaborated in the discussion of FIG. 2. In respect to housing 14, it is to be understood that its construction per se forms no part of the invention. Numerous configurations of housing 14 will be apparent to those skilled in the art. Disposed between the body of the vehicle 12 and the housing 14 are a plurality of radially projecting attachment members 18. It will be apparent to those persons skilled in the art to which the instant invention pertains that numerous constructions may be used for connecting the body 12 and housing 14 together.

Figure 2:
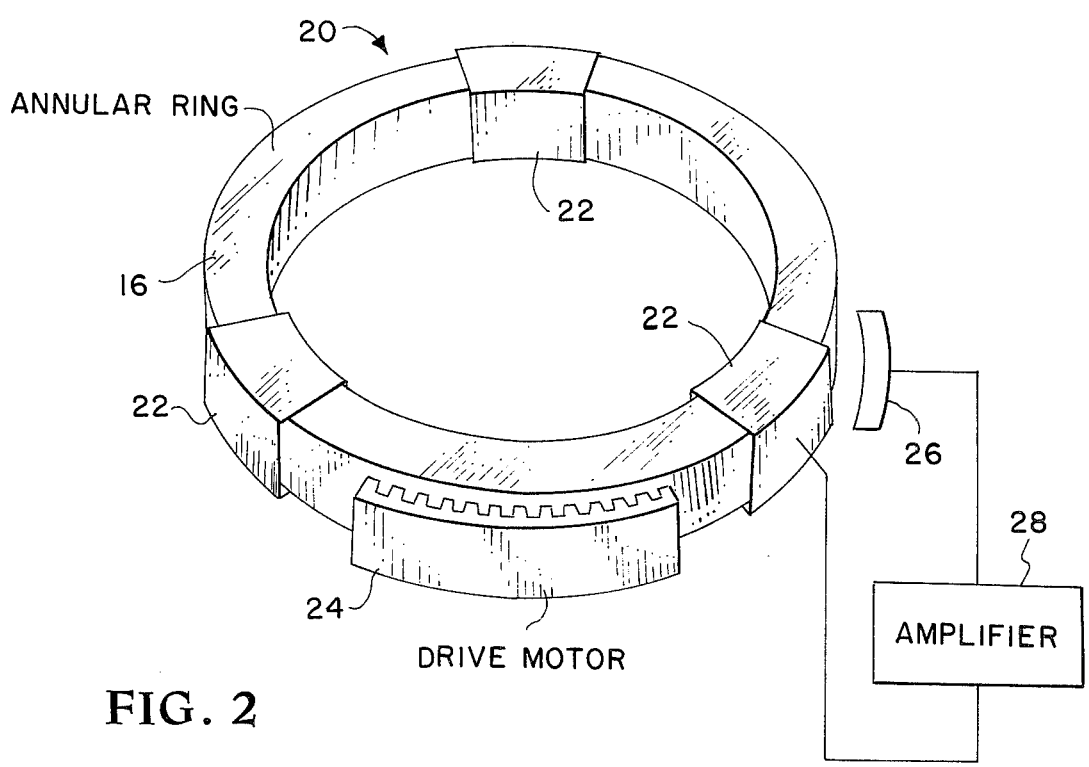
FIG. 2 is a more detailed view of the annular momentum control device used in the instant invention.

Referring to FIG. 2, numeral 20 designates the AMCD which is disposed within housing 14 shown in FIG. 1. The AMCD comprises an annular shaped rotor 16 which is comprised of one or more annular sections which are not shown separately for the sake of clarity. One of the aforementioned sections must be electrically conductive to permit the inducement of an electrical current therein by a time varying magnetic field as will be explained hereinafter. The outer surface of rotor 16 may be covered by a mixture of fiber or fiberglass and epoxy to protect the electrically conductive section of rotor 16 for rotatably supporting the same. Also mounted in close proximity to the surface of the rotor 16 are a plurality of position sensors 26 which produce a signal for controlling a servo mechanism which re-orients rotor 16 when a change in position of rotor 16 occurs with respect to bearing surfaces 22. A suitable type of position sensor is manufactured by the Bently Corporation of Nevada under the name "PROXIMITOR." However, it should be noted that capacitive position sensors could be used with equal facility. Associated with each position sensor 26 is a power amplifier 28 which current amplifies the control signal produced by each sensor 26.

The details of the construction of amplifier 28 are conventional and therefore form no part of the instant invention. One suitable type of amplifier which could be used is an amplifier using saturatable magnetic cores. The amplified signal produced by each amplifier 28 is applied to an electromagnet 40 (shown in FIG. 3) located within each magnetic bearing 22. As has been explained supra, the combination of sensors 26, amplifier 28 and electromagnets 40 forms a servo mechanism which re-orients the rotor 16 with respect to bearing surfaces 22 whenever the rotor strays from its normal position. Rotary motion is imparted to the rotor 16 by a linear induction motor which is comprised of one or more arcuate stator segments 24 and rotor 16. As will be understood by those skilled in the art of induction motors, a rotating magnetic field is induced in rotor 16 which follows the rotation of the magnetic field within the stator. Although FIG. 2 shows the stator segments 24 disposed outside the annulus of rotor 16, it should be equally apparent to those skilled in the art that the stator segments 24 could be disposed within the annulus of rotor 16.

As will be apparent to those skilled in the art, it is also possible to drive the rotor 16 by either an A.C. synchronous motor or a D.C. motor. Both of these types of motors would utilize permanent magnets embedded in the rim of rotor 16 and a segmented stator as discussed supra.

The details of a suitable magnetic suspension arrangement are shown in FIG 3. While FIG. 3 shows one type of suspension which may be used in conjunction with the AMCD of the instant invention, it will be apparent to those skilled in the art that other types of suspensions could also be used, e.g., electrostatic suspensions. Numeral 32 designates the detailed construction of a suitable type of rotor. Mounted on rotor 32 are three permenent magnet projections 34 which are T-shaped in cross-section and totally encircle rotor 32. The pair of projections extending respectively upward and downward from rotor 32 are used for horizontal suspension; the horizontally extending projection 34 is used for vertical suspension. Associated with each projection 34 is a corresponding channel 36. Each channel 36 comprises a circular track for a corresponding projection 34. The channels may be continuous or discontinuous arcuate sections which comprise a circular track. Within each channel 36 is a permanent magnet 38 which radiates flux that is linked with projection 34 to produce a constant suspending force on rotor 32. Also mounted within each channel 36 is an electromagnet 40 whose magnetization is varied to position rotor 32 equidistant from all bearing surfaces 22. As has been explained in the discussion of FIG. 2, any change of position sensors 26 with respect to rotor 32 generates servo control signals which are amplified by amplifier 28 and applied to electromagnet 40 to produce a net force to re-orient rotor 32 in its normal position. The respective horizontal and vertical suspension parts 42 and 44 are annular to permit the mounting of the vehicle body within the annulus of each of the sectors.

If desired, the AMCD may be gimballed with respect to the vehicle to permit active control of the vehicle about the two axes which are perpendicular to the axis of rotation of the rotor. This gimbal connection is illustrated in FIG. 4 wherein the AMCD is connected via outer gimbal actuators 56, 58, gimbal ring 50, and inner gimbal connectors 52, 54 to vehicle 12. A similar type gimbal connection is also illustrated in U.S. pat. No. 3,477,298 issued on Nov. 11, 1969 to Howe.

By varying the rotational speed of the rotor 16, it is possible to control the vehicle about the axis of rotation of the AMCD. As will be apparent to those skilled in the art, variation of the rotational speed may be readily accomplished by control of the power supply of the motor driving rotor 16.

It is to be understood that numerous modifications may be made to the instant invention without departing from the spirit or scope of the instant invention. For example, the particular embodiment illustrated is one where the vehicle being controlled is mounted within the central area of the AMCD. The AMCD could just as well be included within the vehicle being controlled if the situation so dictated, i.e., an aerodynamic shroud might be required in place of the illustrated toroidal shaped housing. In this case the AMCD would be considered within the vehicle or the physical requirements of the AMCD might be such that the outside diameter would be less than that of the vehicle being controlled. It is therefore to be understood that within the scope of the appended claims, the invention may be practiced otherwise than as specifically described herein.

What is claimed as new and desired to be secured by letters Patent of the United States is:

1. In a vehicle of the type having an annular momentum storage device used for stabilization about at least two axes perpendicular to an axis of rotation of the annular momentum storage device, the combination comprising:
    a flight vehicle,
    an annular momentum storage device for said vehicle and including a rotor having an annulus therein;
    a plurality of bearing surfaces disposed in close proximity with said rotor for rotatably supporting the same;
    means for imparting rotary motion to said rotor;
    an annular housing enclosing said rotor, said plurality of bearing surfaces, and said means for imparting rotary motion to said rotor;
    a surface defining the body of said vehicle, said body being disposed within the annulus of said housing and coaxial with the axis of rotation of said rotor; and
    means attaching said housing to said surface defining the body of said vehicle.

2. A vehicle of the type as recited in claim 1 wherein said means for imparting rotary motion to said rotor comprises a linear induction motor having a segmented stator comprising at least one segment disposed equidistant from said rotor and outside the annulus of said rotor.

3. A vehicle of the type recited in claim 2 further comprising a gimbal ring disposed between said vehicle body and said housing to permit active control of the vehicle about two axes perpendicular to said axis of rotation of said rotor.

4. A vehicle of the type as recited in claim 1 wherein said means for imparting rotary motion to said rotor comprises a linear induction motor having a segmented stator comprising at least one segment having a convex surface disposed equidistant from said rotor and within the annulus of said rotor.

5. A vehicle of the type recited in claim 4 further comprising a gimbal ring disposed between said vehicle body and said housing to permit active control of the vehicle about two axes perpendicular to said axis of rotation of said rotor.

6. An annular momentum control device as recited in claim 1 wherein said plurality of bearing surfaces comprise three continuous circular projections mounted on said rotor and first, second and third annular channels mounted on said housing for receiving a different one of said circular projections.

7. A vehicle of the type as recited in claim 6 further comprising:
   a plurality of sensors disposed in close proximity to said rotor for producing a control signal which is a function of the spacing of the sensors with respect to said rotor;
   amplifying means coupled to said position sensors and said electromagnets whereby variation in the position of said rotor with respect to said sensors is corrected by variable magnetization of said electromagnets; and
   each of said channels containing a permanent magnet and an electromagnet.

8. A vehicle of the type as recited in claim 6 wherein each of said channels comprises a plurality of discontinuous arcuate sections forming a circular track for a different one of said circular projections.

9. A vehicle of the type as recited in claim 6 wherein each of said channels comprises a continuous circular track for a different one of said circular projections.

* * * * *